No. 610,868. Patented Sept. 13, 1898.
L. V. PRATIS & P. MARENGO.
UTILIZING HYDROGEN GAS FOR PRODUCING LIGHT AND HEAT.
(Application filed July 15, 1897.)
(No Model.) 3 Sheets—Sheet 1.
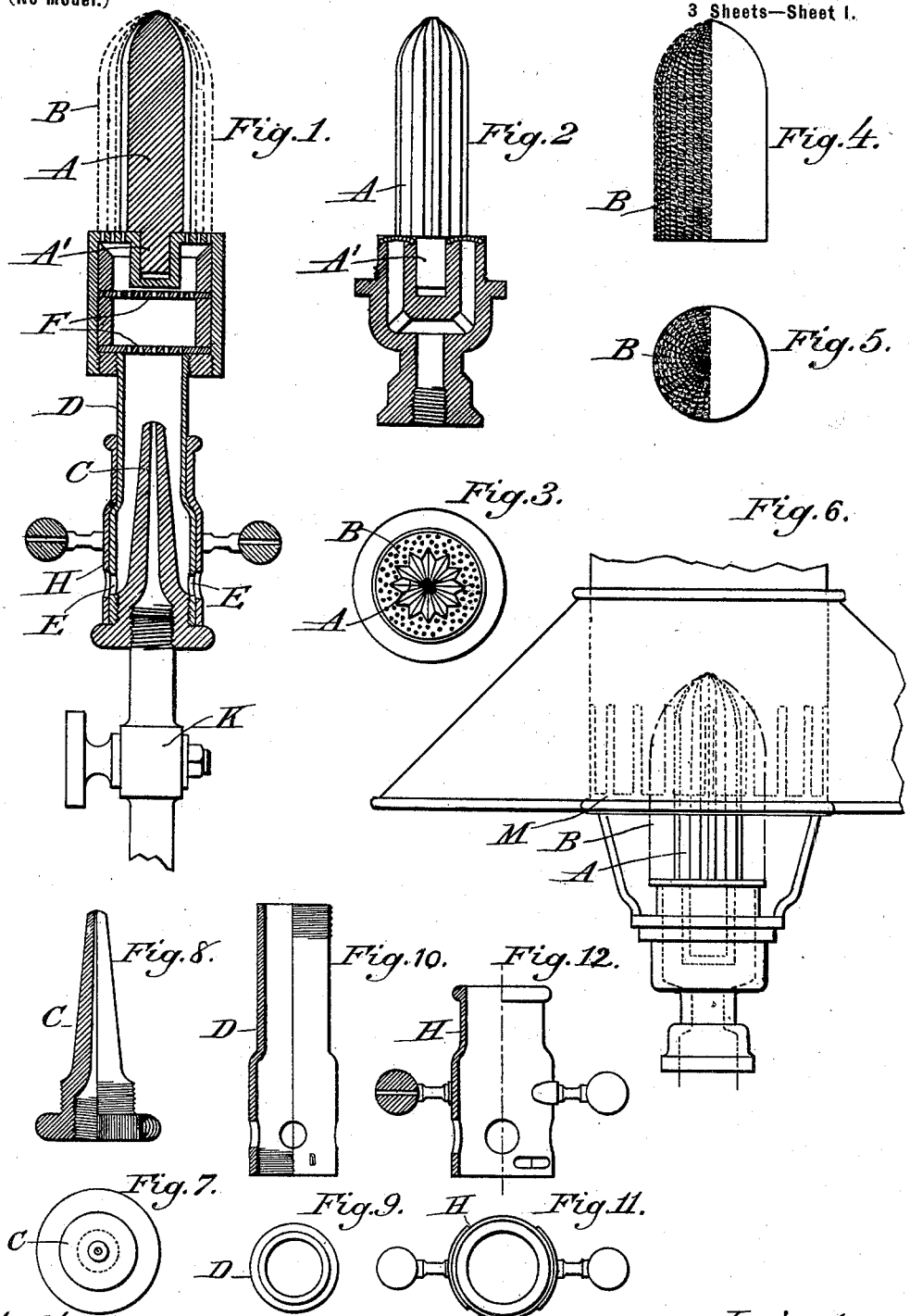

No. 610,868. Patented Sept. 13, 1898.
L. V. PRATIS & P. MARENGO.
UTILIZING HYDROGEN GAS FOR PRODUCING LIGHT AND HEAT.
(Application filed July 15, 1897.)
(No Model.) 3 Sheets—Sheet 2.
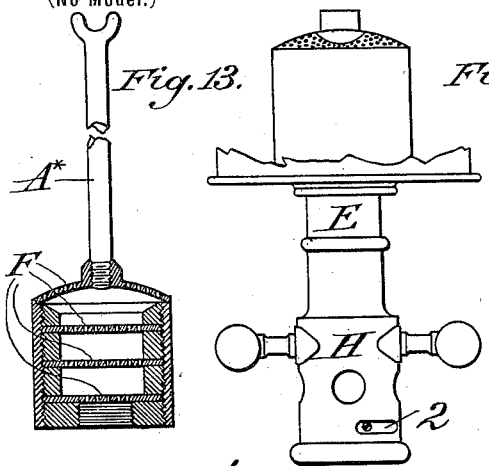
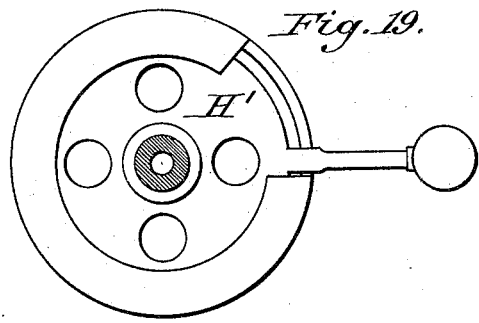
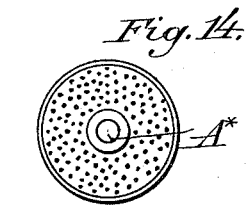
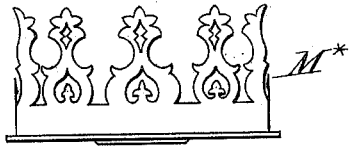
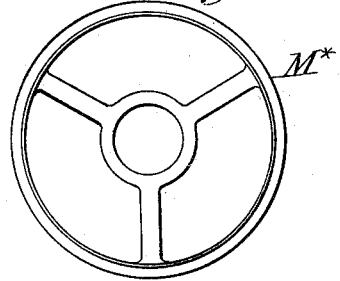
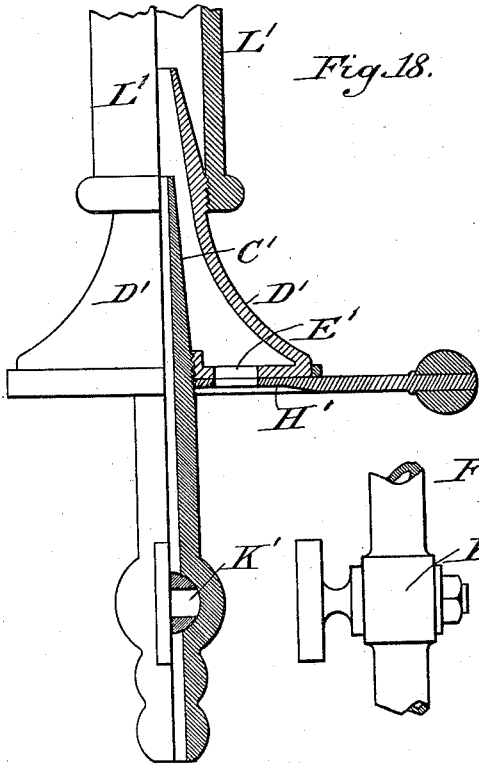
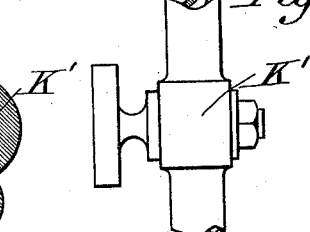
Attest:
Walter W. H. Robinson Jr.
F. H. Schott
Inventors:
Leopoldo Vittorio Pratis
and Pietro Marengo
by Chas. J. Hedrick
their Attorney No. 610,868. Patented Sept. 13, 1898.
L. V. PRATIS & P. MARENGO.
UTILIZING HYDROGEN GAS FOR PRODUCING LIGHT AND HEAT.
(Application filed July 15, 1897.)
(No Model.) 3 Sheets—Sheet 3.
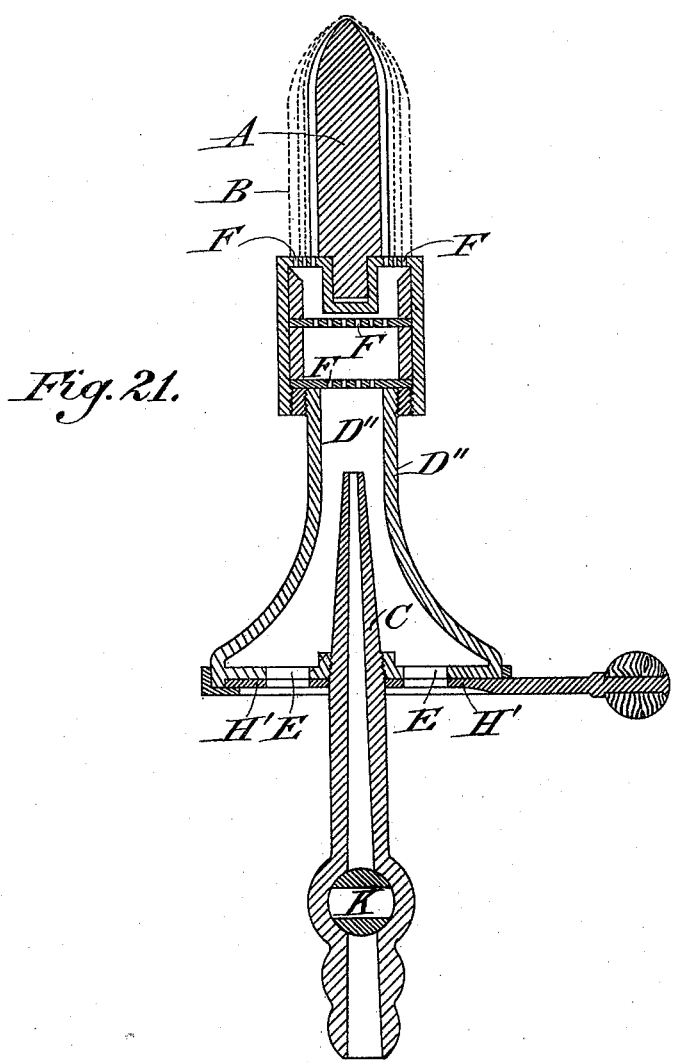
Witnesses.
Walter W. K. Robinson Jr.
F. H. Schott
Inventors:
Leopoldo Vittorio Pratis and
Pietro Marengo
by Chas. J. Hedrick
their attorney

UNITED STATES PATENT OFFICE.

LEOPOLDO VITTORIO PRATIS AND PIETRO MARENGO, OF TURIN, ITALY.

UTILIZING HYDROGEN GAS FOR PRODUCING LIGHT AND HEAT.

SPECIFICATION forming part of Letters Patent No. 610,868, dated September 13, 1898.

Application filed July 15, 1897. Serial No. 644,702. (No specimens.) Patented in England July 22, 1896, No. 16,277^A; in Italy January 26, 1897, No. 43,205; in Belgium February 27, 1897, No. 126,377; in Luxemburg March 12, 1897, No. 2,783, and in Spain March 29, 1897, No. 20,497.

*To all whom it may concern:*

Be it known that we, LEOPOLDO VITTORIO PRATIS and PIETRO MARENGO, citizens of the Kingdom of Italy, residing at Turin, in the said Kingdom, have invented certain new and useful Improvements in Utilizing Hydrogen Gas for Producing Light and Heat, (for which we have secured patents in Italy, No. 43,205, dated January 26, 1897; in Belgium, No. 126,377, dated February 27, 1897; in Great Britain, No. 16,277^A, dated July 22, 1896; in Luxemburg, No. 2,783, dated March 12, 1897, and in Spain, No. 20,497, dated March 29, 1897;) and we do hereby declare the following to be a full, clear, and exact description of the invention.

This invention relates more particularly to the production of light and heat by the combustion of hydrogen gas; but some of the improvements admit of wider application, and each of them is intended to be secured for all the uses to which it may be applicable.

Hydrogen gas, it is well known, possesses no illuminating power in itself, and the attempts which have been made to impart such power to it by means of lime have led to no results of any practicable value for general use.

We have, after a long series of experiments, succeeded in utilizing hydrogen gas for illuminating purposes through the agency of mineral mantles or cages, of which the so-called "Welsbach mantles" are a common example, or other refractory mantles or cages, as of platinum gauze, netting, or other fabric, or of mixed mineral and metallic matter, or of the oxids of metallic earths may be used, the materials being selected according to the place where the gas is utilized or to the amount of light that is desired. By such means we utilize hydrogen for obtaining light; but we apply also hydrogen for the obtainment of heat for cooking and other purposes, such gas being capable of producing a greater amount of heat than can be produced by any other gas.

We may accomplish the distribution of hydrogen through the ordinary means employed for other gas—that is, it may be distributed by means of the usual system of mains and branch pipes, or, since it is possible to compress hydrogen to a very high pressure and to keep it at such high pressure, we may store it in movable receptacles for the illumination of trains, wagons, vehicles, and in general in all cases where the illuminating-gas has to be forced into or be carried in a small space from place to place.

In the accompanying drawings, which form part of this specification, Figure 1 is a view in vertical section of a hydrogen-burner in accordance with the present invention. Fig. 2 is a view of the mantle-holder of Fig. 1, showing said holder in elevation, in connection with another form of burner proper shown in vertical section, the arrangement as a whole being within the invention. Fig. 3 is a view of the mantle-holder in plan and its mantle in horizontal section. Figs. 4 and 5 are views of the mantle detached. Fig. 6 is an elevation showing a lamp complete with the arrangement of burner shown in Fig. 2. Figs. 7, 8, 9, 10, 11, 12, 13, and 14 are views of different parts of the burner, the ordinary mantle-holder being shown in Fig. 13 instead of the new or improved mantle-holder of Fig. 1 and the burner-top of Fig. 13 being correspondingly modified. Fig. 15 is an elevation of the burner having the burner-top of Fig. 13. Figs. 16 and 17 are side and bottom views, respectively, of the gallery of ordinary form for the chimney, also of ordinary form; and Fig. 18 is a view, half in elevation and half in section, of an arrangement of burner within the invention which is preferred for producing heat without illumination. Fig. 19 is a bottom view of the same, showing the gas-pipe in section. Fig. 20 is a view in side elevation of the gas-cock. Fig. 21 is a vertical section of an additional form of illuminating-burner also within the invention.

As shown in Figs. 1, 2, and 3, the mantle-holder is in the form of a pencil A, of refractory material, such as porous porcelain or steatite, fluted or grooved on its exterior or otherwise provided with a number of mantle-supporting points with gas-receiving spaces between, and the incandescing mantle B fits over it more or less closely, as may be desired. The mantle to be used with this holder may be made of any suitable material in any suitable way; but it is considered best to make it of platinum wire of, say, from one-fifth to one-twentieth of a millimeter (seventy-nine ten-thousandths to twenty ten-thousandths of an inch) in diameter, interlaced by weaving like a warp-and-weft fabric or by knitting or in any other manner to enable the fabric to offer a great number of points for incandescence. Its weight may be from four-tenths of a gram to two grams (six and seventeen one-hundredths to thirty and eighty-six one-hundredths grains) per mantle.

The fluted mantle-holding pencil A may be secured to the burner in any way, but is shown as being provided with a reduced extension A', that fits in a socket in the top of the burner. The fluted pencil A, with its mantle B, may be used with burners of the Bunsen type (a new or improved construction of which is shown in Fig. 1 and Figs. 7 to 15, both inclusive) or of the ordinary type, a form of which is illustrated in Fig. 2; but when platinum is used as the incandescing mantle the flame must not be so hot as to fuse the platinum. This might happen without due care with a burner of the Bunsen type, but is less apt to do so with the ordinary type of burner, which admits hydrogen gas (instead of an intimate mixture of hydrogen gas and air) within the mantle. Burners with these mantle-holders and with mantles of platinum wire are particularly fitted for use as suspension-lamps where the object is to direct the light downward, and it is also intended to use them in those cases where the lamp is liable to sudden movements, shocks, or jerks; but in these cases a burner of the ordinary type, Figs. 2 and 6, should be used.

In burning a mixture of hydrogen and air there is a very great danger of explosion within the mantle or below the mantles within the top of the burner, and this would almost certainly result in a rupture of the mantle. It is impracticable, therefore, to burn hydrogen in the ordinary Welsbach lamps, in which the air-inlets remain open and the gas is simply turned on and lighted. To burn hydrogen, it is necessary to turn on and light the hydrogen before admitting the air to mix with it; but besides this it is necessary to have the mixture of air and hydrogen issue from the burner at a greater velocity than is common in the Welsbach burners. The difficulty in preventing the travel of the flame backward in a current of mixed air and hydrogen is a fact of common knowledge; but in the present case the difficulty is increased by the fact that flame must be kept within the mantle. To overcome the difficulty, we take advantage of the fact that the maximum velocity of transmission of flame in a current of mixed air and hydrogen is obtained with a proportion of air (which we believe to be about one and a half volumes of air to one volume of hydrogen) much less than is desirable for burning in contact with an incandescing mantle, (which is most advantageously in excess even of the combining proportions of hydrogen and air—that is, two volumes of hydrogen to about five volumes of air.) Having the hydrogen supplied under a sufficient pressure, (which may be twelve to fifteen millimeters, four thousand seven hundred and twenty-four ten-thousandths to five thousand nine hundred and six ten-thousandths of an inch of water or upward, with the burner shown,) we first turn on and light it, and then we open the air-inlets and adjust the air and gas until a satisfactory flame results, the air being in excess of two and a half times the volume of hydrogen when measured under equal pressure. The pressure to be given the hydrogen will, to a certain extent, depend upon the burner used; but with any given burner the pressure should be at least such as would give to jets of pure hydrogen and air mixed in the ratio of one to one and a half volumes and issuing from the particular burner a velocity of (at the least) about four meters (one hundred and fifty-seven and a half inches) per second.

In order to produce a Bunsen burner well adapted to this purpose, we arrange it like an ejector and provide a jet-nozzle, which we surround by an air-tube, and this latter we contract between the air-inlets and the tip of said nozzle, so that the volume of air which is sucked in is contracted and given a higher velocity. By such higher velocity the admixture of the air and hydrogen is promoted, because the more closely the speed of the air approaches that of the hydrogen the more freely will the two gases diffuse into each other. On the other hand, however, it is not desirable for this admixture to take place in immediate proximity to the jet-nozzle. To obtain the higher velocity of the air without breaking up the hydrogen-jet, the contraction of the air-tube must be so far below the nozzle-tip that the direction of the induced air-current at the said tip shall be parallel rather than transverse to the axis of the jet. What is considered the best distance is shown in the drawings; but a distance less than a fourth part of the diameter of the air-tube at the level of the nozzle-tip would produce a current of air whose direction at the said tip would be transverse rather than parallel to the axis of the hydrogen-jet. Between the nozzle-tip and the refractory mantle we provide a number of perforated plates in order that the mixture of air and hydrogen may be delivered uniformly to the mantle. We find it important to have the nearest of these perforated plates in such proximity to the tip of the gas-nozzle that the pencil of gas from the nozzle will strike and pass through the said plate as a jet before the gas is diffused by the admixture with air, and with this arrangement the contraction of the air-tube between the air-inlets and the tip of the gas-nozzle might in some cases be dispensed with, (although not, it is thought, with advantage,) the nozzle projecting a suitable distance past the air-inlets.

In the Bunsen-burner construction of Fig. 1 and Figs. 7 to 15 the gas-jet nozzle C projects into an air-tube D, which is contracted between the air-inlets E near the base of the gas-nozzle in an offset, and the burner is so constructed above the tip of the gas-nozzle as that the flame may remain above and not descend to the said tip, finely-perforated plates or diaphragms F being arranged in the burner-top above the tip of the gas-nozzle C and the lowermost plate being in such proximity to said tip that the hydrogen-jet will strike it before becoming broken by mingling with the air. The perforated plates give a series of small flames, which are evenly distributed over the upper surface of the top plate of the burner-top and serve to raise the mantle to incandescence. The air-tube is provided with an air-valve, which is shown in these figures as a movable shell H, which has holes therein for registering more or less fully with the air-inlets E when in proper position, and has sufficient imperforate metal between said holes to close said air-inlets when opposite the same. The air-valve has a handle, so that it can readily be manipulated. The gas-pipe leading to the nozzle C would have a suitable cock or valve, as shown, for example, at K in Fig. 1.

In Fig. 13 the mantle-holder A* is of an old form. For the two lowermost plates F are recommended wire-gauze of three hundred meshes to the square centimeter, (nineteen hundred and thirty-five meshes to the square inch,) and for the top plate a sheet of metal about half a millimeter (one hundred and ninety-seven ten-thousandths of an inch) in thickness, perforated with about one hundred and fifty holes of a diameter of six-tenths millimeters, (two hundred and thirty-six ten-thousandths of an inch.) The orifice in the tip of nozzle C may be one millimeter (three hundred and ninety-four ten-thousandths of an inch) in diameter and be separated by a distance of fifteen millimeters (five thousand nine hundred and six ten-thousandths of an inch) from the nearest plate F, the hydrogen in the nozzle C being under a pressure of fifteen millimeters (five thousand nine hundred and six ten-thousandths of an inch) of water. These figures are only given by way of example. There is a screw fixed to the air-tube, whose head enters a slot 2 in the shell H and serves to limit its motion.

For cooking purposes it is preferred to omit the plates F and to have the air-tube extend above the tip of the jet-nozzle C' and be there contracted, as shown in Fig. 18. In this figure the air-tube D' is contracted gradually between the air-inlets E' and the tip of the gas-nozzle C', and the air-valve is in the form of a plate H'; but the contraction by offset and the tubular shell air-valve could be used, the air-tube D being extended above and drawn in over the jet-nozzle like the air-tube D' in Fig. 18. Conversely, the gradually-contracted air-tube D' of Fig. 18, with its plate-valve H', could replace the form of tube D and air-valve H shown in Figs. 1, 9, 10, and 15, the air-tube in such case being preferably continued above the jet-nozzle of the same diameter which it has a short distance below the tip thereof, and provision being made for a suitable draft outside the mantle, between it and the chimney. Such a substitution in the burner of Fig. 1 is shown in Fig. 21, the air-tube and valve-plate being lettered D" and H', respectively, and the other parts as in Fig. 1. A gallery, such as illustrated in Figs. 16 and 17 or in Fig. 6, will permit a suitable draft outside the mantle, between it and the chimney.

In Figs. 1, 13, and 15 the perforated plates form the top of the burner, above which the combustion of the mixture of air and hydrogen takes place. In Fig. 18 the contracted extension of the air-tube D' forms the burner-top, the mixture of air and hydrogen burning above said air-tube D' and not directly at the tip of nozzle C'. At K' is the valve for regulating the supply of hydrogen.

At L' is shown a flue formed of a section of pipe, which is an advantage in protecting the flame and increasing the draft.

The gallery M, Fig. 6, or M*, Figs. 15 to 17, for the chimney of the gas-lamp is shown as of common construction.

In some cases the contraction of the air-tube between the tip of the gas-nozzle and the air-inlets might be omitted in the gas-stove burner of Figs. 18 to 20, provided the said tip is in sufficient proximity to the end of the air-tube; but such omission is not recommended.

We claim as our invention or discovery—

1. A mantle-holder for an incandescent gas-lamp, composed of a refractory pencil provided, as by exterior grooving or fluting, with mantle-supporting points separated from one another by intermediate spaces, substantially as described.

2. An incandescent gas-lamp composed of a burner, a refractory pencil supported thereon and provided, as by exterior grooving or fluting, with mantle-supporting points separated from one another by intermediate spaces, and a refractory mantle fitting over said pencil and arranged to be heated to incandescence by gas from said burner, substantially as described.

3. The method of utilizing hydrogen gas for illuminating, which consists in raising to incandescence a mantle of refractory material by combustion of jets of hydrogen mixed with upward of two and a half times its volume of air, the hydrogen being lighted first and the air then admitted in the specified proportion within the burner-tube to the current of hydrogen on its way to the flame, and the hydrogen being subjected to such a pressure as would give with the burner used a velocity of over three meters (one hundred and eighteen and eleven one-hundredths inches) per second to a mixture of one volume of hydrogen and one and a half volumes of air, substantially as described.

4. An incandescent gas-burner for the combustion of hydrogen, having in addition to the incandescing mantle, a jet-nozzle for the gas extending into the air-tube beyond the air-inlets, a burner-top having a number of perforated plates, arranged for the combustion of the mixed air and hydrogen to take place above the top plate, and an air-tube contracted between said air-inlets and the tip of the jet-nozzle and arranged to deliver the air and gas into said burner-top, the contraction of said air-tube being so far below said tip that the induced air-current shall be parallel rather than transverse to the jet's axis, namely at a distance below said tip in excess of a quarter-diameter of the air-tube at the tip-level, whereby the ignition of the hydrogen back of the burner-top is insured against while at the same time the combustion of the mixture of air and hydrogen above the burner-top is suitable for making the mantle incandescent, substantially as described.

5. An incandescent gas-burner for the combustion of hydrogen, having in addition to the incandescing mantle, a jet-nozzle for the gas extending into the air-tube beyond the air-inlets, a burner-top having a number of perforated plates, arranged for the combustion of the mixed air and hydrogen to take place above the top plate, an air-tube contracted between said air-inlets and the top of the jet-nozzle and arranged to deliver the air and gas into said burner-top, and a valve for said air-inlets, the contraction of said air-tube being so far below said tip that the induced air-current shall be parallel rather than transverse to the jet's axis, namely at a distance below said tip in excess of a quarter-diameter of the air-tube at the tip-level, whereby the ignition of the hydrogen back of the burner-top is insured against while at the same time the combustion of the mixture of air and hydrogen above the burner-top is suitable for making the mantle incandescent, substantially as described.

6. A gas-burner for the combustion of hydrogen having a jet-nozzle for the gas extending into the air-tube beyond the air-inlets, a burner-top, adapted for the combustion of the mixed air and hydrogen to take place above said top, and an air-tube contracted between said air-inlets and the tip of the jet-nozzle and arranged to deliver the air and gas into said burner-top, the contraction of said air-tube being so far below said tip that the induced air-current shall be parallel rather than transverse to the jet's axis, namely at a distance below said tip in excess of a quarter-diameter of the air-tube at the tip-level, whereby the ignition of the hydrogen back of the burner-top is insured against while at the same time the combustion takes place in a moderate manner above the burner-top, substantially as described.

7. A gas-burner for the combustion of hydrogen having a jet-nozzle for the gas extending into the air-tube beyond the air-inlets, a burner-top, adapted for the combustion of the mixed air and hydrogen to take place above said top, an air-tube contracted between said air-inlets and the tip of the jet-nozzle and arranged to deliver the air and gas into said burner-top, and a valve for said air-inlets, the contraction of said air-tube being so far below said tip that the induced air-current shall be parallel rather than transverse to the jet's axis, namely at a distance below said tip in excess of a quarter-diameter of the air-tube at the tip-level, whereby the ignition of the hydrogen back of the burner-top is insured against while at the same time the combustion takes place in a moderate manner above the burner-top, substantially as described.

8. An incandescent gas-burner composed of an incandescent mantle, a burner-top with perforated plates therein, an air-tube, and a jet-nozzle extending within the said tube beyond the air-inlets thereof into such proximity to said top that the pencil of gas will strike and pass through the said plates as a jet, before the gas is diffused by admixture with air, substantially as described.

9. A gas-burner, composed of a burner-top arranged for combustion above itself, an air-tube, and a jet-nozzle extending within said air-tube beyond the air-inlets thereof into such proximity to the said top that the pencil of gas will pass through the same in a jet before the gas is diffused by admixture with air, substantially as described.

10. An incandescent gas-burner, composed of an incandescent mantle, a burner-top with perforated plates therein, an air-tube contracted between its air-inlets and the tip of the said nozzle at a distance below said tip in excess of a quarter-diameter of the air-tube at the tip-level, and a jet-nozzle extending within the said tube beyond the air-inlets thereof into such proximity to said top that the pencil of gas will strike and pass through the said plates as a jet, before the gas is diffused by admixture with air, substantially as described.

11. A gas-burner, composed of a burner-top arranged for combustion above itself, an air-tube contracted between its air-inlets and the tip of the said nozzle at a distance below said tip in excess of a quarter-diameter of the air-tube at the tip-level, and a jet-nozzle extending within said air-tube beyond the air-inlets thereof into such proximity to the said top that the pencil of gas will pass through the same in a jet before the gas is diffused by admixture of air, substantially as described.

12. An incandescent gas-burner composed of an incandescent mantle, a burner-top with perforated plates therein, an air-tube contracted between its air-inlets and the tip of the said nozzle at a distance below said tip in excess of a quarter-diameter of the air-tube at the tip-level, a valve for said air-inlets, and a jet-nozzle extending within the said tube beyond the air-inlets thereof into such proximity to said top that the pencil of gas will strike and pass through the said plates as a jet, before the gas is diffused by admixture with air, substantially as described.

13. A gas-burner, composed of a burner-top arranged for combustion above itself, an air-tube contracted between its air-inlets and the tip of the said nozzle at a distance below said tip in excess of a quarter-diameter of the air-tube at the tip-level, a valve for said air-inlets, and a jet-nozzle extending within said air-tube beyond the air-inlets thereof into such proximity to the said top that the pencil of gas will pass through the same in a jet before the gas is diffused by admixture with air, substantially as described.

In testimony whereof we affix our signatures in presence of two witnesses.

LEOPOLDO VITTORIO PRATIS.
PIETRO MARENGO.

Witnesses:
MARIO CAPUCCIO,
HUGO PIZZOTTI.